United States Patent [19]

Chittenden

[11] 4,216,085
[45] Aug. 5, 1980

[54] FLOTATION METHOD AND APPARATUS

[75] Inventor: Jimmie A. Chittenden, Amarillo, Tex.

[73] Assignee: Iowa Beef Processors, Inc., Dakota City, Nebr.

[21] Appl. No.: 934,932

[22] Filed: Aug. 18, 1978

[51] Int. Cl.² ............................................. B03D 1/24
[52] U.S. Cl. .................................... 210/44; 210/195.1; 210/221 P; 261/76
[58] Field of Search .................... 210/13, 44, 199, 205, 210/221 P, 220, 195, 519, 221 R; 209/164, 165, 168, 170; 261/76, 117, 121 R, 123, DIG. 75; 366/173, 177, 150, 338, 339

[56] References Cited

U.S. PATENT DOCUMENTS

| | | | |
|---|---|---|---|
| 1,958,325 | 5/1934 | Veatch | 209/170 |
| 2,538,340 | 1/1951 | Tomek et al. | 210/221 R |
| 2,751,425 | 6/1956 | Rupp | 261/117 |
| 3,015,396 | 1/1962 | Quast | 210/221 P |
| 3,032,199 | 5/1962 | Sumiya | 209/170 |
| 3,147,221 | 9/1964 | Johnston | 209/168 |
| 3,175,687 | 3/1965 | Jones | 210/221 P |
| 3,286,992 | 11/1966 | Armeniades | 261/79 A |
| 3,664,638 | 5/1972 | Grout et al. | 366/338 |
| 3,704,006 | 11/1972 | Grout | 210/63 R |
| 4,031,006 | 6/1977 | Ramirez | 210/44 |
| 4,045,336 | 8/1977 | Isteai | 261/DIG. 75 |
| 4,071,447 | 1/1978 | Ramirez | 220/221 P |

FOREIGN PATENT DOCUMENTS

| | | | |
|---|---|---|---|
| 654003 | 12/1962 | Canada | 210/221 P |
| 846227 | 7/1970 | Canada | 210/221 P |

Primary Examiner—Ernest G. Therkorn
Attorney, Agent, or Firm—Beveridge, DeGrandi, Kline & Lunsford

[57] ABSTRACT

Aerated liquid injected into contaminated wastewater provides minute bubbles which ascend slowly and become attached to contaminants to buoy them to the liquid surface. To produce an intimate mix of the aerated liquid and wastewater, the aerated liquid is injected into the wastewater through opposed mutually confronting openings. Streams emerging from the openings collide to create an area of high turbulence.

20 Claims, 3 Drawing Figures

FLOTATION METHOD AND APPARATUS

BACKGROUND AND SUMMARY

This invention relates to a flotation apparatus and method for removing contaminants from wastewater. It is particularly well suited to removing grease particles and other suspended solids from packinghouse effluent by introducing into the packinghouse effluent a gas-containing liquid which has or forms microbubbles which attach themselves to the suspended solids, floating the suspended solids to the liquid surface for removal.

Inasmuch as gravitational separation cannot effectively remove fat and tissue particles which have a density similar to that of water, microbubble flotation processes have been used in the past for treatment of packinghouse effluent. Such apparatus has included a large tank which provides a flotation chamber, a feed line introducing the packinghouse effluent into one end of the tank and a baffle and weir structure leading to an effluent discharge chamber at the opposite end of the tank. Aerated liquid is introduced into the feed line to provide millions of microbubbles having a diameter in the general range of 100 microns. These minute bubbles ascend slowly, attaching themselves to suspended particles, buoying the suspended particles to the surface of the treatment tank where they are removed by paddles on a skimming chain. The clarified liquid then passes under a baffle and over a weir into an effluent chamber. A portion of the clarified liquid is withdrawn, aerated and recycled to the feed line as the aerated liquid.

The present invention involves an improved apparatus and method for introducing the aerated liquid into the wastewater to form an intimate mix of the incoming contaminated wastewater and the aerated liquid. Further, the invention pertains to the structure for distributing the intimate mix within the flotation chamber to optimize contaminant removal. The supply means for introducing the gas containing liquid into the wastewater includes a pair of discharge openings immersed in the wastewater and oriented in spaced opposed mutually confronting relationship whereby streams of gas-containing liquid emerging from the openings collide to create an area of high turbulence and produce an intimate mix of gas-containing liquid and wastewater. Preferably, the gas-containing liquid is produced by passing a gas injected into a liquid stream through a motionless mixer provided with stationary internal vanes which produce shear forces in the gas-containing liquid stream. Adjacent vanes in the mixer are twisted in opposite directions to move the gas-containing liquid stream alternately in a left-hand helical path and a right-hand helical path. To distribute the intimate mix of wastewater and gas-containing liquid in the tank, a transverse baffle is aligned with and located downstream of the opposed discharge openings, the transverse baffle is oriented transversely to the path from the inlet means to the effluent discharge means, and horizontal baffles are vertically spaced from the transverse baffle to aid in directing the flow of the mix horizontally across the width of the flotation chamber. At spaced locations along the length of the flotation chamber, there are panels providing sets of vertical vanes which reduce the transverse flow of liquid in the tank and minimize turbulence after the desired distribution of the mix is attained.

The invention may be accomplished by a wide variety of devices and techniques, a preferred example of which is shown and described in this specification.

BRIEF DESCRIPTION OF A PREFERRED EMBODIMENT

Figure 1:
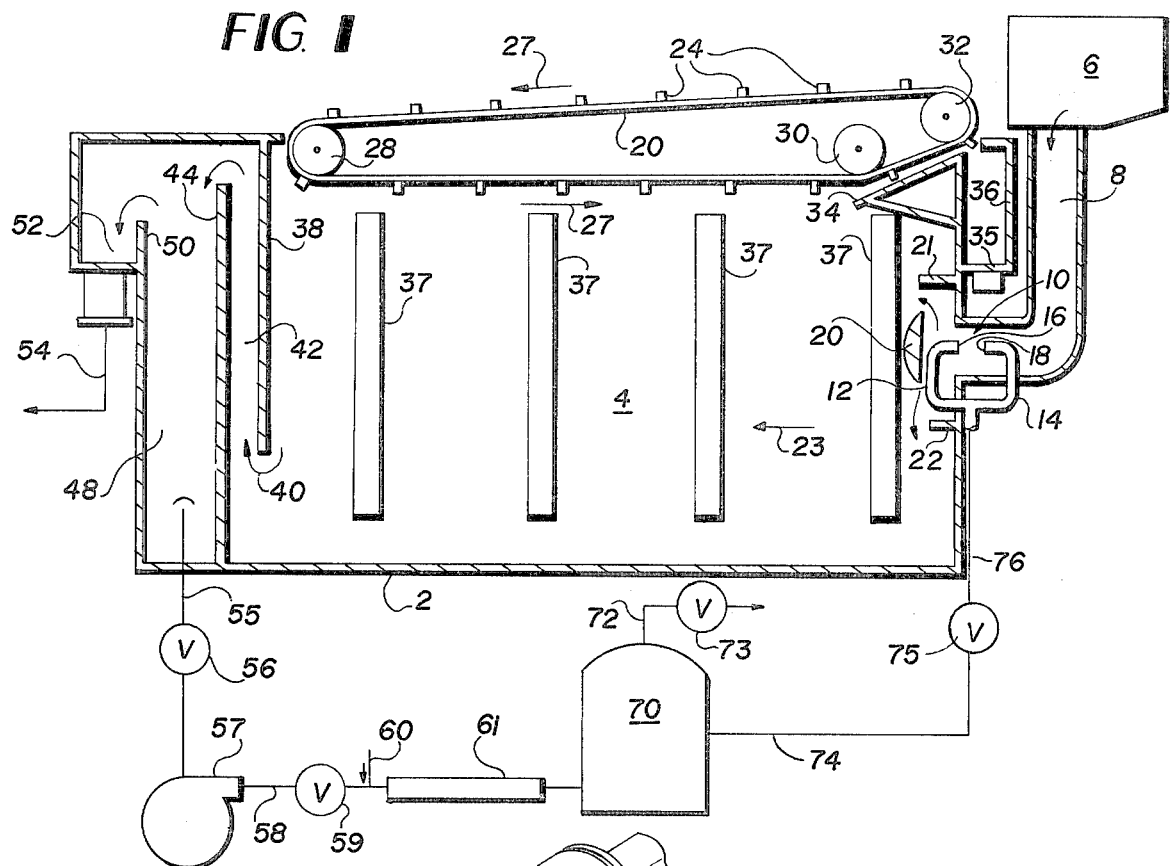
FIG. 1 is a diagrammatic view of a flotation apparatus constructed according to the invention.

FIG. 1 shows a tank 2 which provides a flotation chamber 4 where the wastewater is treated by microbubble flotation. Multiple outlets from the packinghouse are fed to chamber 4 from an inlet hopper 6 and feed line 8. The walls of the feed line 8 enclose and carry a stream of wastewater in an axial flow path toward the flotation chamber. In a mixing zone 10, gas-containing liquid is injected into the wastewater to produce an area of high turbulence and create an intimate mix of the gas-containing liquid and wastewater. The supply means for introducing the aerated liquid into the wastewater includes pipes 12 and 14 which terminate respectively in outlet openings 16 and 18 which are surrounded by the walls of feed line 8 and immersed in the wastewater therewithin. The openings 16 and 18 are substantially parallel to walls of line 8 and to the axial flow path of the wastewater in line 8. The openings 16 and 18 are in spaced opposed mutually confronting relationship, causing streams of the gas-containing liquid to create in the feed line 8 an area of high turbulence and produce the intimate mix of aerated liquid and wastewater. Downstream of and aligned with the openings 16 and 18 is a circular baffle 20 oriented transversely to the general flow path of material through the flotation chamber. The baffle 20 directs the mix transversely in the flotation chamber. Planar horizontal baffles 21 and 22 are vertically spaced from the transverse baffle 20 to air in directing the flow of the mix horizontally across the width of the flotation chamber.

The microbubble-containing mix then flows through the flotation chamber in the direction indicated by the arrow 23, this flow being generally quiescent or near-laminar. During this movement, the microbubbles which have attached themselves to grease and other solids particles tend to float the particles upwardly forming a layer of skimmings on the surface of the liquid in the chamber 4. These skimmings are removed by a series of redwood paddles 24 attached to a skimming chain 26 which moves slowly toward the inlet end of the flotation chamber 4 in the direction of arrows 27 on a set of sprockets 28, 30 and 32. The paddles 24 move the skimmings onto the beaching board 34 which during cold weather is heated by live steam to prevent grease buildup. From the beaching board, the skimmings move gravitationally into the skimming hopper 36 and down an electrically heated slide 35 for removal and appropriate disposal or reclaiming. To prevent damage to the pump which removes the contents of hopper 36, it is constantly fed liquid from the recycle pump described below, and it is automatically deactivated when the recycle pump is not operating.

To minimize turbulence in the chamber 4, deter transverse currents and provide near-laminar flow, there are four smoothflow panels 37 formed of vertical vanes which are spaced across the entire width of the tank. Ultimately, the liquid flowing through the tank arrives at a baffle 38 which extends downwardly and obstructs the entire liquid surface to prevent the passage of any skimmings. Submerged portions of the baffle 38 are perforated or terminated so that clarified liquid may move in the path indicated by arrow 40 into a space 42 on the upstream side of an overflow weir 44, the height of which governs the depth of liquid in chamber 4. The liquid flows over the weir as indicated by arrow 46 into a recycle chamber 48, and then over another weir 50 into the effluent chamber 52 which has a discharge connection 54 connected to a sewage system or other appropriate disposal means. Although not shown, the bottom of the tank 2 normally will have a longitudinally-extending rotating grit-removal screw conveyor for removing heavy solid components which gravitate to the bottom of the chamber 4. The grit screw and dump valve are automatically deactivated by a float valve if the liquid level in chamber 48 falls two feet below its designed level. If this liquid level falls six feet, another float valve activates an alarm and cuts off power to the entire system.

Figure 2:
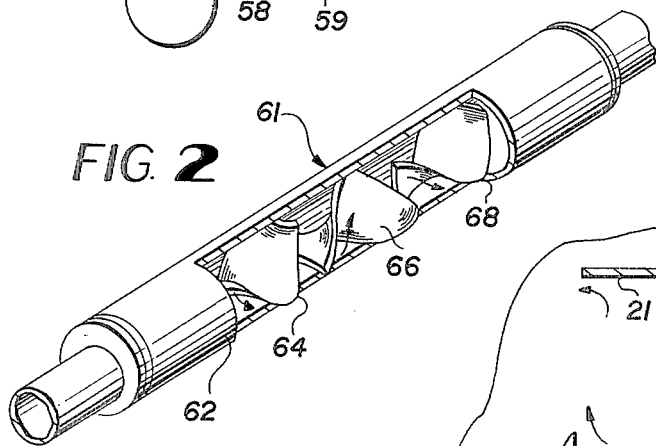
FIG. 2 is a broken perspective view of a motionless mixer used in producing the gas-containing liquid.
Figure 3:
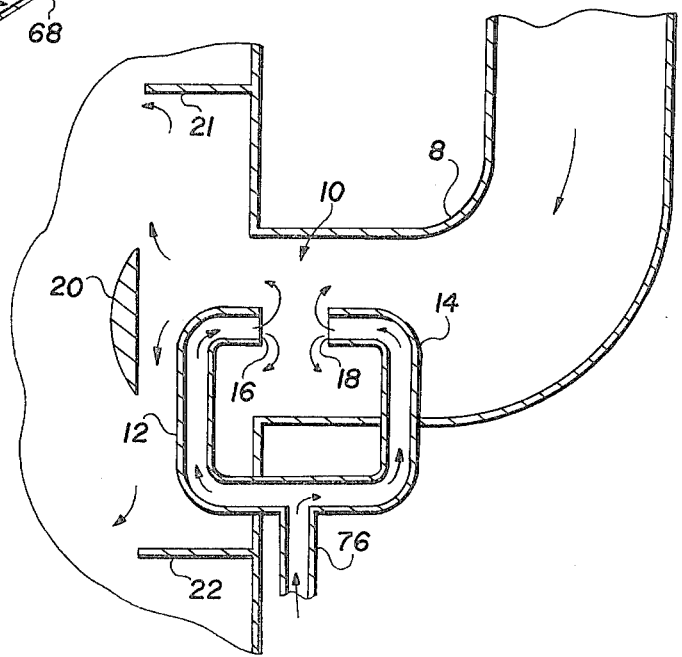
FIG. 3 is an enlarged sectional view showing the preferred means for introducing the gas-containing liquid into the incoming wastewater.

The gas-containing liquid injected into the wastewater is preferably produced by aerating liquid which has been withdrawn from the chamber 48. The liquid from chamber 48 passes through a pipe 55 and valve 56 to a recycle pump 57 which is capable of delivering 300 gpm at 55 psig to pressurize the recycle liquid. The discharge side of pump 57 leads the pressurized liquid through a pipe 58 and valve 59 to an injection point where pressurized air is introduced by pipe 60 at a rate of about 5 cfm. Before being injected into the liquid stream from pipe 60, the air passes through a filter, regulator and needle valve. The air when released from pipe 60 is not significantly dispersed in the liquid stream. The liquid stream and substantially undispersed air then are passed through the motionless mixer 61 which is preferably located within about three inches or one pipe diameter from the injection point of pipe 60. The mixer 61 disperses the gas throughout the liquid stream, whereby a major portion of the bubbles used for flotation will be very small, preferably on the order of about 5-100 microns. Such bubbles are more effective than larger bubbles which ascend too rapidly, often without becoming attached to the contaminant particles. As shown in FIG. 2, the motionless mixer 61 includes a conduit 62 provided with a set of stationary internal vanes, three of which are shown at 64, 66 and 68. These vanes split and twist the flow, producing shear forces in the gas-containing liquid stream passing through the mixer 61. Preferably, the vane 66 is twisted in an opposite direction to the vanes 64 and 68 adjacent thereto in order to move the gas-containing liquid stream alternately in a left-hand helical path and a right-hand helical path as it moves through the mixer 61. Also, it is preferred that the downstream edge of each vane be angularly displaced from the upstream edge of the succeeding vane so that the flow in split as well as being counter-rotated. Motionless mixers are disclosed and discussed in greater detail in U.S. Pat. Nos. 3,286,992, 3,664,638 and 3,704,006; and, the use of such a mixer to produce an aerated liquid in flotation apparatus is disclosed in U.S. Pat. No. 4,031,006.

From the motionless mixer 61, the aerated liquid flows to the retention tank 70, the upper portion of which contains an air blanket. An air release line 72 extending into the retention tank 70 assists in maintaining the contained liquid at an appropriate level. The line 72 has an adjustable valve 73, and is vented to the atmosphere at the inlet hopper 6. When the liquid level in tank 70 recedes below the lower end of the air release line 72, the retention tank 70 is vented through valve 73 to the atmosphere. Air, having a lower viscosity than the liquids, rushes through line 72 very quickly, reestablishing the desired liquid level in the retention tank. When the water level in tank 70 is above the end of the air release line 72, some water will flow through line 72 to the inlet hopper 6. Valve 73 is adjusted experimentally to a setting which will assure that such a flow is constant but not excessive.

From the retention tank 70 where its pressure is about 35 psig, the aerated liquid passes through pipe 74 to the diaphragm backpressure valve 75 which produces a pressure drop in the aerated liquid, enabling some of the dissolved air to come out of solution to form microbubbles, many of which have diameters in the range of 5-100 microns. The depressurized liquid is then carried by a pipe 76 and pipes 12 and 14 to the outlet openings 16 and 18 which release the bubble-containing and bubble-forming aerated liquid into the wastewater.

From this description, the operation of the apparatus will be evident. The supply of aerated liquid is produced by passing a mixed stream of air and water through the motionless mixer 61 into retention tank 70 and then to the discharge openings 16 and 18 which are immersed in the wastewater flowing into the unit from feed line 8. The spaced opposed relationship of the discharge openings 16 and 18 produces a collision of their respective streams, creating an area of high turbulence in zone 10 to produce an intimate mix between the aerated liquid and the wastewater in feed line 8. This mix of aerated liquid and wastewater is deflected transversely in vertical and horizontal directions by the baffle 20, and its lateral horizontal movement is encouraged by the presence of the planar baffles 21 and 22. The liquid flowing along the length of chamber 4 then passes through the panels 37 which further reduce any transverse currents. The contents of the flotation chamber 4 then move in the general direction of arrow 23 as contaminants are buoyed to the liquid surface by microbubbles which are attached thereto. The material floated to the liquid surface is removed by the paddles 24 which convey the skimmings up the beaching board 34 and into the skimmings hopper 36. The clarified contents moving toward the discharge end of the flotation chamber pass beneath the baffle 38, over the weir 44 into recycle chamber 48 and then over weir 50 into the effluent chamber 52 for disposal. A portion of the clarified liquid in recycle chamber 48 is recirculated by the recycle pump to the aerating means.

Persons familiar with the field of this invention will realize that its objectives may be achieved by various structures which differ from the illustrated preferred embodiment. Therefore, it is emphasized that the invention is not limited only to this embodiment but is encompassing of variations thereto and modifications thereof which fall within the spirit of the following claims.

I claim:

1. Apparatus for removing contaminants from wastewater, comprising,
   a flotation chamber, inlet means for introducing wastewater into the flotation chamber, said inlet means including walls for enclosing a stream of wastewater moving in an axial flow path, effluent discharge means for discharging clarified liquid from the flotation chamber at a location spaced from said inlet means, means for producing a gas-containing liquid, supply means for introducing said gas-containing liquid into the wastewater, said supply means have a pair of discharge openings located in the inlet means and surrounded by the wall of the inlet means, said discharge openings being in spaced opposed mutually confronting relationship whereby streams of gas-containing liquid emerging therefrom collide to create an area of high turbulence and produce an intimate mix of gas-containing liquid and wastewater.

2. The apparatus of claim 1 having a transverse baffle which is aligned with and located downstream of the discharge openings, said transverse baffle being oriented transversely to the path from the inlet means to the effluent discharge means, whereby said transverse baffle directs the flow of said mix transversely in the flotation chamber.

3. The apparatus of claim 2 having horizontal baffles vertically spaced from the transverse baffle to aid in directing the flow horizontally across the width of the flotation chamber.

4. The apparatus of claim 3 wherein the means for producing a gas-containing liquid includes means for injecting a gas into a liquid stream and a mixer including a conduit provided with stationary internal vanes for producing shear forces in the gas-containing liquid stream.

5. The apparatus of claim 4 wherein adjacent said vanes are twisted in opposite directions to move the gas-containing liquid stream alternately in a left-hand helical path and a right-hand helical path.

6. The apparatus of claim 1 wherein the means for producing a gas-containing liquid includes means for injecting a gas into a liquid stream and a mixer including a conduit provided with stationary internal vanes for producing shear forces in the gas-containing liquid stream.

7. The apparatus of claim 6 wherein adjacent said vanes are twisted in opposite directions to move the gas-containing liquid stream alternately in a left-hand helical path and a right-hand helical path.

8. The apparatus of claim 1 having a plurality of skimming paddles and means for moving said paddles over the liquid surface of the flotation tank to skim from the flotation tanks contaminants floated to the liquid surface; said effluent discharge means including a froth-obstructing baffle extending across and downwardly from the liquid surface to prevent the passage of contaminants floated to the liquid surface, an effluent discharge chamber and an overflow weir positioned between said overflow weir and said froth-obstructing baffle, and means for carrying liquid from the downstream side of said overflow weir to said means for producing a gas-containing liquid.

9. The apparatus of claim 8 having a transverse baffle which is aligned with and located downstream of the discharge openings, said transverse baffle being oriented transversely to the path from the inlet means to the effluent discharge means, whereby said transverse baffle directs the flow of said mix transversely in the flotation chamber.

10. The apparatus of claim 9 having horizontal baffles vertically spaced from the transverse baffle to aid in directing the flow horizontally across the width of the flotation chamber.

11. The apparatus of claim 8 wherein the means for producing a gas-containing liquid includes means for injecting a gas into a liquid stream and a mixer including a conduit provided with stationary internal vanes for producing shear forces in the gas-containing liquid stream.

12. The apparatus of claim 11 wherein adjacent said vanes are twisted in opposite directions to move the gas-containing liquid stream alternately in a left-hand helical path and a right-hand helical path.

13. The apparatus of claim 1 wherein the axes of said discharge openings are substantially parallel to said axial flow path of the stream of wastewater within the walls of the inlet means.

14. A method of removing contaminants from wastewater comprising the steps of moving the wastewater in an axial flow path through an inlet passage to a flotation tank introducing gas-containing liquid into the wastewater by directing two streams of said liquid against each other within said inlet passage located in the inlet means and surrounded by the walls of the inlet means, said streams colliding to provide an area of high turbulence and produce an intimate mix of said liquid and wastewater, introducing said intimate mix into said flotation chamber, and buoying contaminants to the surface of said mix by permitting bubbles formed in said liquid to attach themselves to said contaminants.

15. The method of claim 14 wherein the axes of said two colliding streams are substantially parallel to the axial flow path of the wastewater in the inlet passage.

16. The method of claim 14 including the step of producing the gas-containing liquid by moving a liquid stream into which gas has been injected through a conduit provided with stationary twisted vanes to produce shear forces in the stream.

17. The method of claim 16 including the step of moving said mix against a transverse baffle to direct the flow of said mix transversely in a flotation chamber.

18. The method of claim 17 including the step of obstructing the vertical flow of said mix from said transverse baffle to distribute the mix horizontally across the width of the flotation chamber.

19. The method of claim 14 including the step of moving said mix against a transverse baffle to direct the flow of said mix transversely in a flotation chamber.

20. The method of claim 19 including the step of obstructing the vertical flow of said mix from said transverse baffle to distribute the mix horizontally across the width of the flotation chamber.

* * * * *